(No Model.)
L. H. WHITE.
HANDLED BLACKING BOX.
No. 353,725. Patented Dec. 7, 1886.
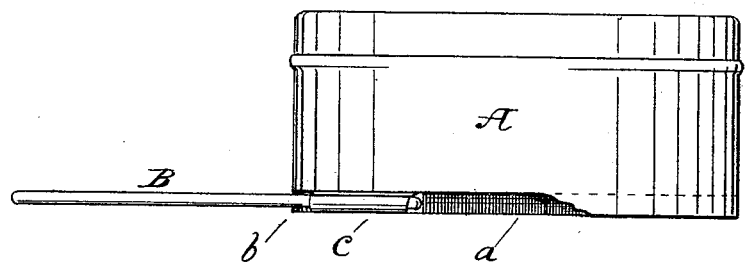
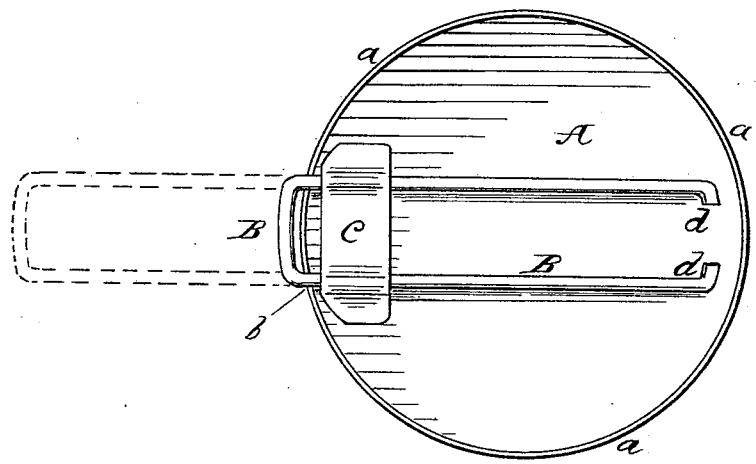

UNITED STATES PATENT OFFICE.

LOUIS H. WHITE, OF ST. AUGUSTINE, FLORIDA, ASSIGNOR TO SAMUEL M. BIXBY, OF NEW YORK, N. Y.

HANDLED BLACKING-BOXES.

SPECIFICATION forming part of Letters Patent No. 353,725, dated December 7, 1886.

Application filed August 23, 1886. Serial No. 211,858. (No model.)

*To all whom it may concern:*

Be it known that I, LOUIS H. WHITE, of St. Augustine, St. Johns county, Florida, have invented certain new and useful Improvements in Handled Blacking-Boxes, whereof the following is a specification.

The present improvement relates to handled blacking-boxes, wherein the handle is affixed to the box, but made movable in respect thereto for being opened out when the box is in use, and at other times to be shut away beneath the box. Heretofore such movable handles have been in some manner pivoted or hinged, and in no case capable of being brought within the dimensions—i. e., the thickness or height of the blacking-box.

In the annexed drawings, which are designed to illustrate my invention, Figure 1 is a side elevation of a blacking-box, partly in section, showing the handle drawn out. Fig. 2 shows the box as seen from the bottom, with the handle pushed in out of the way.

My improved device differs from others in having a sliding, instead of a swinging, action of the handle.

The box A of the drawings has a rim, $a$, projecting below the bottom to form a recess. B is the sliding handle, and is made, in this instance, of a short wire bent in form of a loop or fork. The sides of the loop pass through openings at $b$, made for the purpose in the rim $a$. To steady the handle, and impart stiffness thereto when the box is in use, a suitable guide, $c$, is secured to the bottom of the box within the rim. By these means two distinct bearings are obtained for a sufficient distance to secure steadiness and stiffness therein. By arranging these bearings within a recess in the bottom of the box the handle, when pushed in, as in Fig. 1, is brought entirely within the thickness or height of the box, while the slight protrusion at the side is no wise in the way. The stop-pieces $d$ prevent the handle from being pulled out of its bearings and detached from the box.

In the above invention I do not restrict myself to the form of handle, nor to the mode of obtaining the recess, as the latter may be formed in other ways—for example, by striking in a groove or grooves directly in the flat bottom—in which case the rim $a$ could be omitted.

The invention secures at the least cost a firm, practical, and convenient handle, and which does not in the least interfere with packing for transportation or otherwise.

I claim as my invention—

1. A blacking-box having a sliding handle arranged to slide into a recess under the box made to receive it.

2. A blacking-box having a recess underneath, a sliding handle, and guides for controlling such handle, in combination with a sliding handle having stop-pieces at its inner extremity, for the purposes specified.

3. A blacking-box provided with a handle which may be drawn out for use, in combination with a recess beneath the box, formed by a projecting rim, in which recess the handle is stowed away after use.

LOUIS H. WHITE.

Witnesses:
B. F. OHMING,
A. L. XIMANIES.